UNITED STATES PATENT OFFICE.

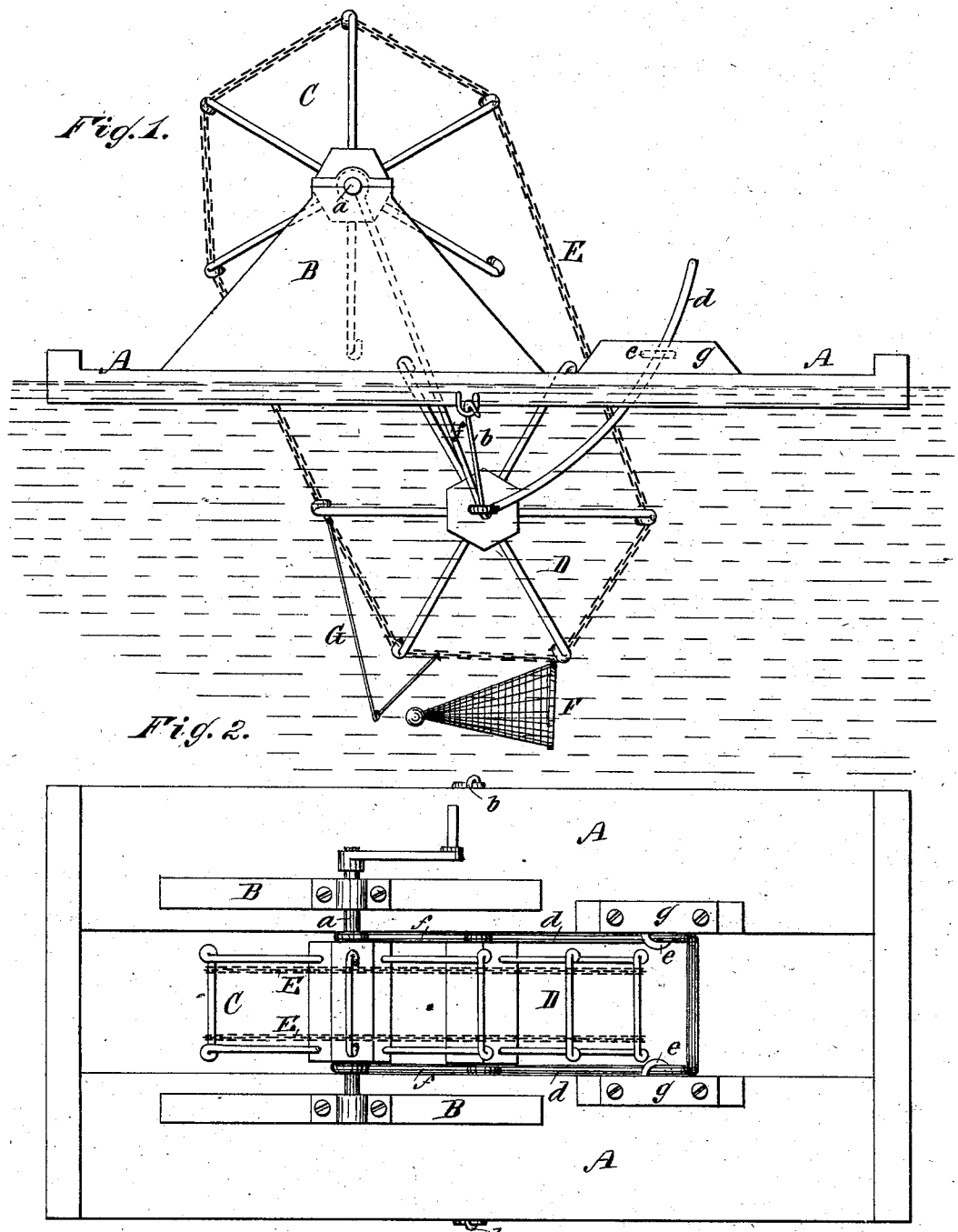

THOMAS HEATON, OF VANCOUVER, WASHINGTON TERRITORY.

MECHANICAL DEVICE FOR CATCHING FISH.

SPECIFICATION forming part of Letters Patent No. 259,143, dated June 6, 1882.

Application filed January 17, 1882. (Model.)

*To all whom it may concern:*

Be it known that I, THOMAS HEATON, of Vancouver, in the county of Clarke and Territory of Washington, have invented a new and Improved Mechanical Device for Catching Fish, of which the following is a full, clear, and exact description.

My invention consists of an endless chain passing over two skeleton wheels, one of the wheels being journaled in suitable shaft-supports upon two connected floats or boats, the other being submerged in the water, the endless chain being provided with suitable nets for catching and elevating the fish. The submerged skeleton wheel may be adjusted to suit different depths of water, and, instead of using the nets for catching fish, I may use suitable rakes, forks, or tines upon the chain for gathering and elevating oysters and clams, and for stirring up or agitating the deposits of sand and mud in rivers or harbors, so that the current or tide will increase the depth of the water, which also constitutes part of my invention; and my invention further consists in the details of construction and the arrangements and combinations of parts, all as hereinafter more fully described.

Reference is to be had to the accompanying drawings, forming part of this specification, in which similar letters of reference indicate corresponding parts in both the figures.

Figure 1 is a side elevation of my invention, and Fig. 2 is a plan view of the same.

A A represent the floats or boats, which are formed with the elevated shaft-supports B B, in which the crank-shaft *a* of the upper skeleton wheel, C, is journaled, and D represents the submerged skeleton wheel, and E E represent the endless chains which pass over the skeleton wheels. The axle of the submerged wheel is hung from the shaft *a* by the rods *f f*, and is stayed to the boats A A by means of the rods *b b* in such manner that the wheel is permitted to be swung for raising or lowering it to suit the depth of water. The submerged wheel is controlled and held in any desired position by means of the rods or chains *d d*, which are attached at their lower ends to the axle of the wheel, and pass up through the loops *e e*, secured on the inner faces of the blocks *g g*, secured upon the inner edges of the boats or floats.

When the machine is to be used for catching fish the chains are to be provided with the nets F, (any suitable number;) but when used for elevating oysters the nets may be removed, and the rakes, forks, or tines G (as many sets as desired) attached to the chains; and when used for stirring up or agitating the beds of rivers or harbors, or for elevating sand, the nets and oyster-forks will be removed and the chains will be supplied with any suitable devices for those purposes.

I am aware that it is not new to use an endless chain of buckets raised by a windlass and caused to discharge into a spout, or to combine with an endless belt a stationary rake and rakes movable with the belt; but

What I claim as new and of my invention is—

1. The combination of two endless parallel chains on two skeleton wheels and two floats supporting the same, whereby oyster-dredges, fishing-nets, or sand-elevators may be operated, as described.

2. The combination, with floats having blocks *g* and carrying-shaft *a*, of a submerged wheel, D, having its axle suspended both from shaft *a* by the rods *f* and by hooks and eyes from the floats, and held in any desired position by the rods *d*, passing through loops *e* on said blocks *g*, as shown and described.

3. In combination with the boats or floats A A, skeleton wheel C, journaled upon the boats, the submerged wheel D, hung on the rods *f f*, and the endless chains E, provided with the fish-nets F, the submerged wheel being adjustable by means of the braces *b b* and the rods or chains *d d*, substantially as and for the purposes described.

THOMAS HEATON.

Witnesses:
JOHN A. KELLEE,
W. MULLIN.